United States Patent

[11] 3,582,036

| [72] | Inventor | Rafael M. Condis<br>4321 Rosecrans, Hawthorne, Calif. 90250 |
|---|---|---|
| [21] | Appl. No. | 739,426 |
| [22] | Filed | June 24, 1968 |
| [45] | Patented | June 1, 1971 |

[54] MOLD FOR MAKING HONEYCOMBS
7 Claims, 9 Drawing Figs.

[52] U.S. Cl. .................................................. 249/152,
6/11, 25/128, 249/151, 249/178, 249/180
[51] Int. Cl. ........................................................ B22c 9/22,
A01k 47/04
[50] Field of Search .......................................... 249/152,
145, 146, 150, 151, 176, 177, 178, 184, 186, 180,
124, 136, 64; 25/128 (K), 128 (S); 6/10, 11

[56] References Cited
UNITED STATES PATENTS

| 662,682 | 11/1900 | Weed .......................... | 6/11 |
|---|---|---|---|
| 744,970 | 11/1903 | Miller ......................... | 249/180X |
| 765,349 | 7/1904 | Wilson ........................ | 249/178 |
| 795,518 | 7/1905 | Lamp .......................... | 249/180X |
| 817,008 | 4/1906 | Schoeneman ............... | 249/64 |
| 1,260,147 | 3/1918 | Cornvelle ................... | 249/180X |
| 1,328,813 | 1/1920 | Blanchard ................... | 6/11 |
| 1,449,085 | 3/1923 | Brand ......................... | 249/145 |
| 1,526,118 | 2/1925 | Casey ......................... | 249/151 |
| 2,465,276 | 3/1949 | Ryder ......................... | 18/Dig. 33 |
| 2,951,260 | 9/1960 | Harrison ..................... | 18/Dig. 60 |
| 3,373,460 | 3/1968 | Ladney ....................... | 249/152X |
| 3,439,732 | 4/1969 | Andreoli ..................... | 18/Dig. 33 |

*Primary Examiner*—J. Spencer Overholser
*Assistant Examiner*—Ben D. Tobor
*Attorney*—Smyth, Roston & Pavitt

ABSTRACT: This disclosure describes a method of making a beeswax honeycomb of the type used by bees as a receptacle for honey. The honeycomb is made from a mold which includes an end wall, a peripheral wall and a plurality of at least partially collapsible core elements extending outwardly from the end wall and surrounded by the peripheral wall.

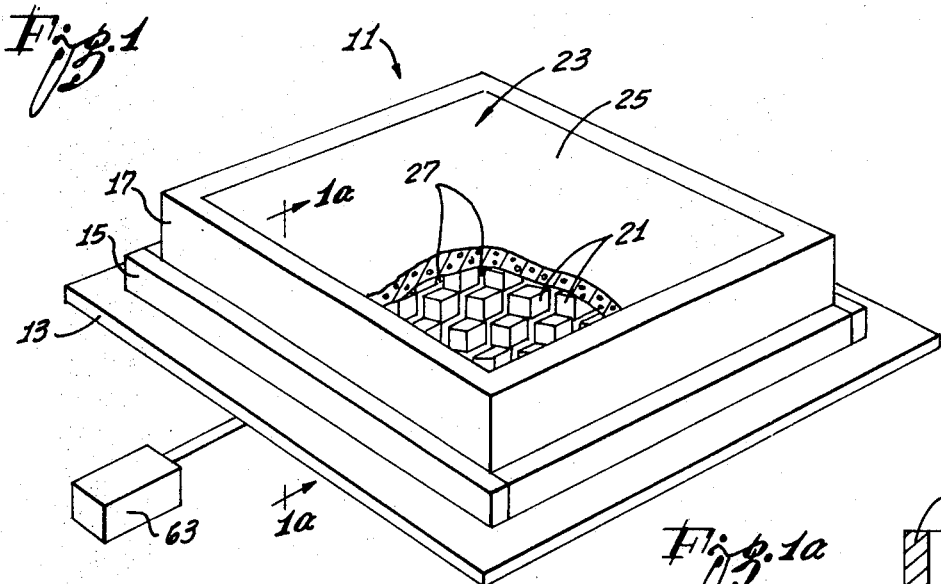
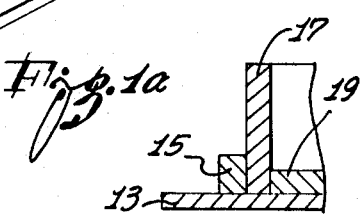
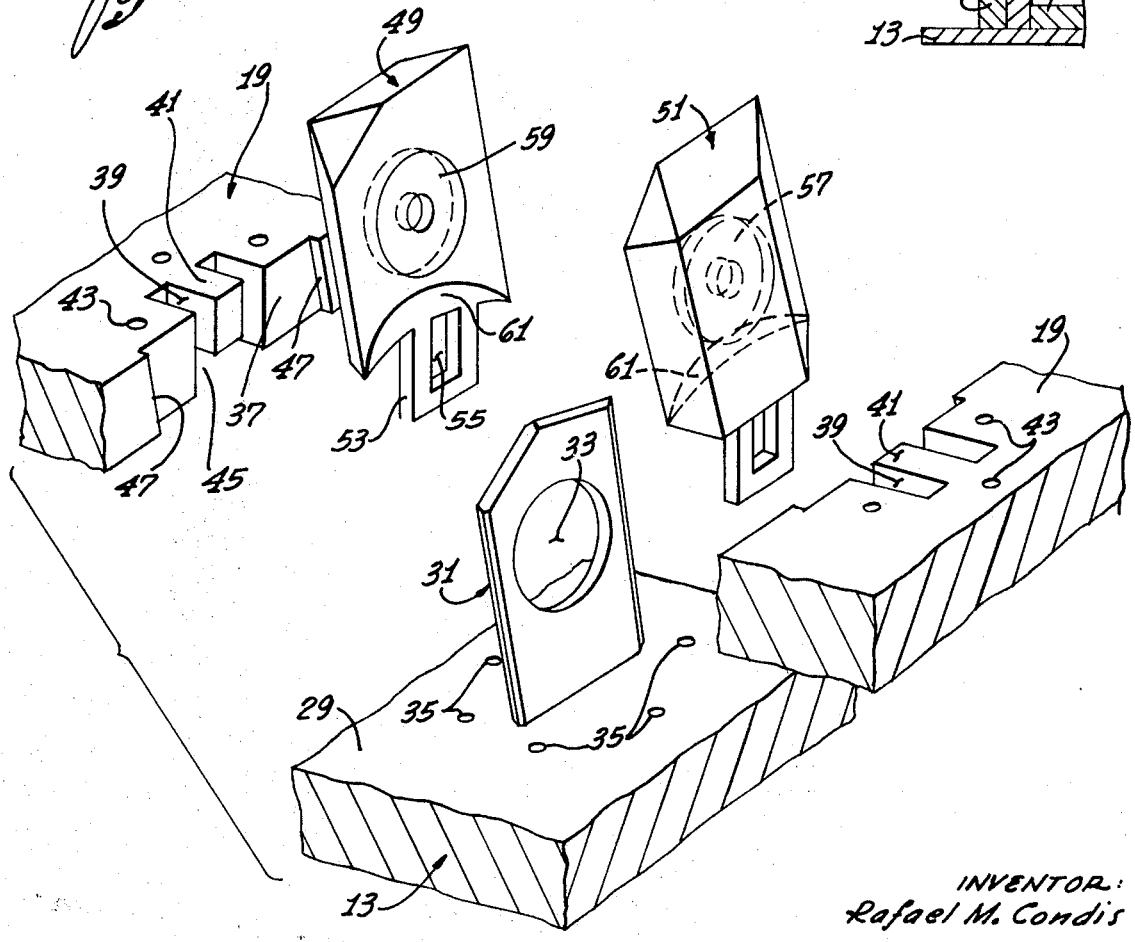

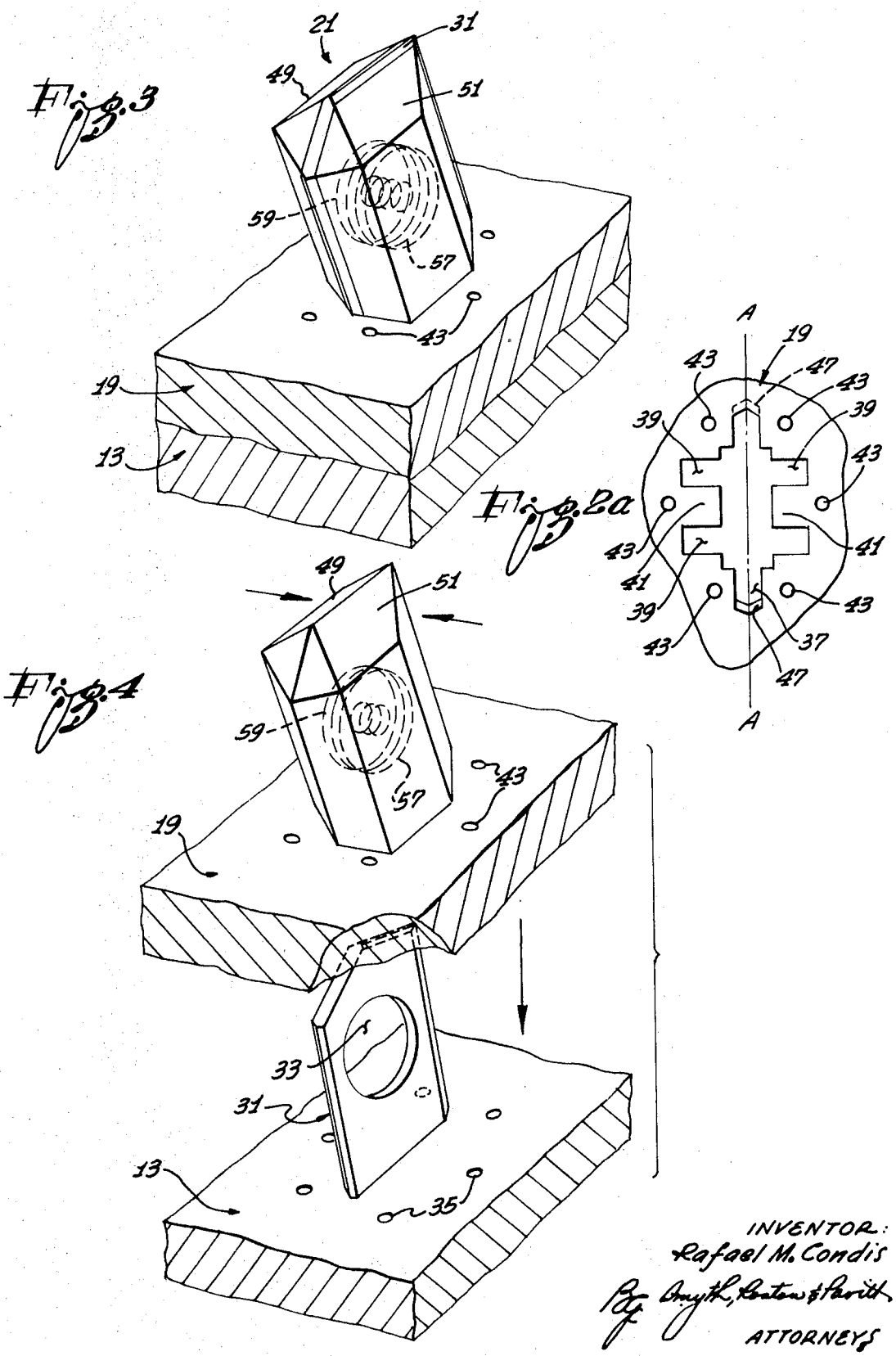

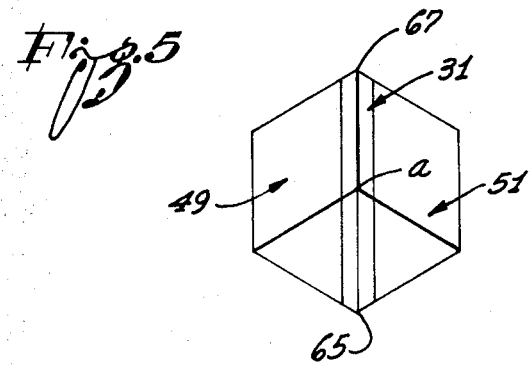
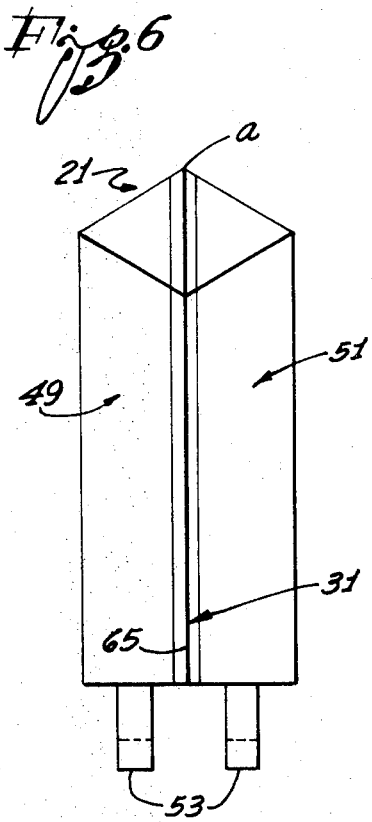
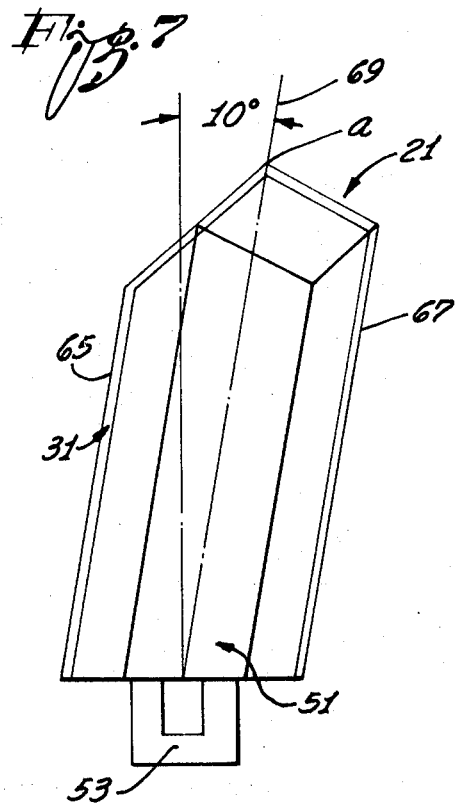

MOLD FOR MAKING HONEYCOMBS

BACKGROUND OF THE INVENTION

A first step for the bee in the production of honey is to produce a honeycomb of beeswax. Each such honeycomb is of the same shape and is made to certain exact dimensions. Once the honeycomb is made, the bees begin to deposit honey therein.

This process is quite inefficient because the bee must first expend considerable time in making a honeycomb and during this time, it cannot produce honey. In an attempt to make this process more efficient, it is been proposed to remove the honey from the honeycomb produced by the bees and reuse the honey comb. However, as some honey is sold in the honeycomb, and because the honeycomb, if reused, will eventually break, there is still a substantial need for additional honeycombs. Furthermore, the reutilization of the honeycombs is undesirable because it necessitates cleaning of the honeycombs.

SUMMARY OF THE INVENTION

The present invention overcomes these problems by teaching that a honeycomb can be molded of beeswax and put out for use by the bees thereby allowing the bees to devote full time to honey production.

The seemingly easy task of molding a honeycomb is made quite complex by several factors. First, in order that the bees will use the manmade honeycomb, it is necessary that the honeycomb bee be substantially identical to a honeycomb made by bees. For example, the honeycomb must be made of beeswax and each cell must be constructed substantially as if done by bees. It is difficult to construct a mold which will form the walls of the honeycomb cells sufficiently thin so that the wall thickness approaches that of a bee made honeycomb. Another significant problem is removal of the thin-walled beeswax honeycomb from the mold. That is, the beeswax honeycomb is not at all structurally strong as it is quite difficult to remove the honeycomb from the mold.

To obviate these problems, the present invention provides a mold which may include an end wall, a peripheral wall and a plurality of core elements so arranged and configured as to provide an accurately dimensioned honeycomb. To facilitate removal of the relatively flimsy honeycomb from the mold, at least some of the core elements are at least partially collapsible to thereby free the honeycomb from significant frictional resistance to being removed. In addition, the mold is preferably coated with an antibonding agent such as water or a mixture of water and honey to thereby tend to prevent the beeswax from bonding to the mold and thereby further facilitate removal of the honeycomb from the mold.

The collapsible core concept can be advantageously embodied in a mold in which each of the core elements include at least two core sections with one of the core sections being withdrawable from the backside of the mold after the beeswax has solidified. The withdrawal of one of the core sections has the effect of shrinking or partially collapsing the associated core element to thereby facilitate removal of the solidified honeycomb from the mold. In addition, the segmentized core elements can be accurately and relatively easily constructed with a minimum clearance between the adjacent core elements to provide the necessary wall thinness.

In a preferred form of the invention, each of the core elements includes two outer sections having an inner core section sandwiched therebetween. The two outer core sections are movable toward each other to effect the desired shrinkage of the core element. The inner core section is withdrawable from the core element to thereby permit movement of the two outer core sections toward each other to effect the partial collapsing of the core element. To assure that such shrinkage occurs, magnetic means may be provided to automatically pull the two outer core sections together when the inner core section is removed. In addition, the magnetic means functions to hold the segmentized core elements together during the molding operation.

Although various portions of each of the core elements may be removable, the present invention teaches that the core section that is removable should preferably be a section which affects a reduction in the maximum length and width dimensions of the core element. Stated differently, both of the dimensions of the core element as viewed in plan should be reduced by the removal of the removable core section. In addition, the removal of the removable core section should preferably reduce the overall height of the core element. Accordingly, in the preferred embodiment of the invention, the core elements are hexagonal and have a pointed central portion and the removable core section is preferably in the form of a slat which extends in straight line fashion between opposed apicies of the hexagon.

In a preferred construction of a mold embodying these concepts, a first plate is provided on which a plurality of pairs of movable core sections are mounted. The first plate has a plurality of openings therein, one for each of the collapsible core elements. The mold also includes a second plate having a plurality of core sections rigidly mounted thereon and extendable through the openings in the first plate to cooperate with the pairs of core sections to define a plurality of the collapsible core elements.

The invention, both as to its organization and method of operation together with further features and advantages thereof may best be understood by reference to the following description taken in connection with the accompanying illustrative drawing.

BRIEF DESCRIPTION OF THE DRAWINGS

FIG. 1 is a perspective view of a honeycomb mold with a portion of the honeycomb broken away to illustrate a plurality of the core elements.

FIG. 1a is a fragmentary sectional view taken along line 1a—1a of FIG. 1.

FIG. 2 is a fragmentary exploded perspective view showing a typical collapsible core element and the portions of the upper and lower plates used to mount such core element with the upper plate being broken apart to better illustrate the structural features thereof.

FIG. 2a is a fragmentary plan view of the portion of the upper plate used to mount one of the core elements.

FIG. 3 is a perspective view of one of the assembled core elements.

FIG. 4 is a perspective view showing how the removable core sections can be removed to result in collapse of the collapsible core element.

FIG. 5 is a top plan view of one of the collapsible core elements.

FIG. 6 is a front elevational view of one of the collapsible core elements.

FIG. 7 is a side elevational view of one of the collapsible core elements.

DESCRIPTION OF THE PREFERRED EMBODIMENT

Referring to the drawings and in particular to FIGS. 1 and 1a, reference numeral 11 designates a honeycomb mold constructed in accordance with the teachings of this invention. Generally, the mold includes a lower plate 13 having a retainer 15 affixed thereto. A peripheral wall 17 of rectangular outline rests on the upper surface of the lower plate 13 intermediate the retainer 15 and an upper plate 19 and surrounds a region of the plates. The plates 13 and 19 form an end wall for the mold 11. A plurality of collapsible core elements 21 are mounted on the plates 13 and 19 and extend upwardly therefrom. The mold may also include some noncollapsible core elements (not shown). As shown in FIG. 1, beeswax has been poured into the mold 11 to form a honeycomb 23.

Reference herein to upper and lower, e.g. upper and lower plates, is used only in respect of FIG. 1, it being understood that the mold may be used in various orientations thereof. Also, the mold 11 may include many sections such as the section shown in FIG. 1 to thereby accomplish the molding of numerous honeycombs simultaneously.

The honeycomb 23 includes a plate portion 25 and a plurality of cells 27 which are formed by the adjacent core elements 21. The honeycomb 23 may be considered as a half section of a full honeycomb as in the usual case, two of the honeycombs 23 are secured together with the plate portions 25 thereof abutting and with the cells 27 projecting outwardly from the plate portions on opposite sides thereof. The mold 11 is configured and dimensioned to produce a honeycomb which is identical to the honeycombs produced by the honeybees.

FIG. 2 illustrates a typical fragment of the lower plate 13. The lower plate 13 has an upper face 29 and an upwardly extending core section 31, with one of the core sections 31 being provided for each of the collapsible core elements 21. The core section 31 is in the form of a slat having a circular aperture 33 therein and is shaped and dimensioned to provide a narrow central segment of one of the core elements 21. Six relatively small apertures 35 are provided in the lower plate 13 around each of the core sections 31 (only five being shown in FIG. 2).

FIG. 2a shows a typical fragment of the upper plate 19 at a location at which one of the core elements 21 is to be constructed. As illustrated in FIG. 2, the plate 19 is shown as being divided along a line A-A of FIG. 2 with such division being merely for the purposes of illustration. As shown in FIG. 2a the plate 19 has a slot or opening 37 therein which is shaped and dimensioned to receive the core section 31. Four grooves 39 extend generally transversely of the slot 37 and define two spaced, opposed ribs 41 therebetween. Six apertures 43 are provided around the slot 37 and the grooves 39 in generally hexagonal configuration with the apertures 43 being located and sized to be in registry with the apertures 35 when the two plates 13 and 19 are assembled as shown in FIG. 1. As best seen in FIG. 3, the apertures 43 lie outside the assembled core element 21 and thus lie in the narrow clearance space between adjacent core elements.

As shown in FIG. 2, the ribs 41 are of lesser thickness than the plate 19 to provide a downwardly opening recess 45 beneath each of the ribs. As shown in FIGS. 2 and 2a, the slot 37 has end edges 47 which are tapered to correspond to the taper of the longitudinal edges of the core section 31.

A pair of outer core sections 49 and 51 are mountable respectively on the ribs 41 with one such pair being provided for each of the collapsible core elements 21. The core sections 49 and 51 each have a flange 53 defining a hole 55 sized and dimensioned to slidably receive one of the ribs 41 to thereby permit the core sections 49 and 51 to be movable toward and away from each other. Each of the core sections 49 and 51 are accurately sized and dimensioned to form outer sections, respectively, of one of the core elements 21. The core section 51 carries a magnet 57 exposed on the inner surface thereof and the core section 49 carries ferromagnetic material 59 on the inner surface thereof. The magnet 57, the ferromagnetic material 59, and the aperture 33 are sized and located so as to be in registry when the core element 21 is assembled.

The core element 49 can be mounted on the rib 41 by inserting the flange 53 thereof into the slot 37 until the hole 55 is in registry with the rib 41 at which time the core element 49 is moved to the left as viewed in FIGS. 2 and 2a to thereby cause the hole 55 to slidably receive the rib 41. The recess 45 is sufficiently large to receive the lower portion of the flange 53 so that the flange will not project beneath the lower face of the plate 19. The core section 51 can be similarly mounted on its respective rib 41.

With the core elements 49 and 51 so mounted on their respective ribs 41 the magnet 57 and the ferromagnetic material 59 will attract to move the core sections 49 and 51 together as shown in FIG. 4. To completely assemble the core elements 41, the lower plate 13 is moved upwardly to urge the core sections 13 into their respective apertures 37 and to force apart the associated core sections 49 and 51. To facilitate moving of the core elements 49 and 51 apart, these core elements are preferably provided with divergent cam surfaces 61 (FIG. 2). With the lower plate 13 moved upwardly, each of the core elements will appear as shown in FIG. 3 in which the core sections 31, 49 and 51 cooperate to form the core elements. The resulting core element is held tightly together by the magnet 57 and the ferromagnetic material 59 which are in registry through the aperture 33 in the core section 31. With the two plates 13 and 19 thus assembled, the peripheral wall 17 can be slid between the retainer 15 and the upper plate 19 as shown in FIGS. 1 and 1a.

With the mold 11 thus assembled, the interior thereof may be coated with an antibonding agent such as water or a honey and water mixture. Beeswax is then poured into the upper end of the mold and allowed to flow downwardly into the narrow passages defined by the adjacent core elements 31. To speed up this process, a vacuum tank 63 may be appropriately connected to communicate with the registering apertures 43 and 35 to thereby tend to draw the beeswax downwardly toward the plate 19. The beeswax is then allowed to set to form the honeycomb 23. After the beeswax has set and hardened the lower plate 13 is withdrawn from the mold to thereby reduce the length, width and height dimensions of the collapsible core elements 21. The magnet 57 and the ferromagnetic material 59 of each of the core elements moves the two remaining core elements 49 and 51 toward each other to thereby effectively shrink the core elements 21 and tend to free each of the core elements 21 from the honeycomb 23. The peripheral wall 17 is then removed from the mold and the honeycomb 23 is removed from the collapsed core elements 21.

As indicated hereinabove, it is important that the mold 11 be so constructed that the honeycomb 23 will be substantially identical to a honeycomb produced by the honeybee and such construction is known to those skilled in the art. For example, the cell wall thickness should be about 0.003 inch, the cells should be inclined at an angle of about 10° from the plate portions 25, and the cells should be generally hexagonal in plan and have a pointed bottom. The core elements must be sized and analyzed to provide these results. For example the adjacent core elements should be spaced about 0.003 to provide thin cell walls.

FIGS. 5—7 show how the three core sections 31, 49 and 51 cooperate to produce one of the collapsible core elements 21. As shown in FIG. 5, the core element 21 forms an equilateral hexagon in plan and has longitudinal edges 65 and 67. The core element 21 has a central axis 69 (FIG. 7) which extends centrally therethrough and through a point $a$ which is the highest point on the core element.

It is apparent that by removal of the core element 31, that both the length and width dimensions of the core element 21 as viewed in plan (FIG. 5) are reduced. That is, by removing the element 31, the magnet 57 is operative to draw the two core elements 49 and 51 together thereby effecting a reduction in the length and width dimensions. Similarly, as best seen in FIGS. 6 and 7, removal of the core section 31 also reduces the height of the core element.

Although exemplary embodiments of the invention have been shown and described, many changes, modifications and substitutions may be made by one having ordinary skill in the art without necessarily departing from the spirit and scope of this invention.

I claim:

1. A mold comprising:
   first and second generally platelike members arranged in generally confronting relationship;
   a peripheral wall surrounding at least a portion of said platelike members to define therewith a cavity;
   means on said platelike members defining a plurality of collapsible core elements, said collapsible core elements projecting into said cavity;
   each of said collapsible core elements including first and second core sections, means for mounting said first and second core sections on said first platelike member for movement generally toward and away from each other, said first platelike member having an opening therein generally between said first and second core sections, an intermediate core section mounted on said second platelike member and projecting through said opening and between said first and second core elements, and magnetic means on said first and second core sections for urging said first and second core elements toward each other; and said platelike members being movable away from each other to withdraw the intermediate core section from each of said collapsible core elements whereby the magnetic means urges the first and second core sections of each of said collapsible core elements toward each other to thereby reduce the cross-sectional area of said collapsible core elements.

2. A mold as defined in claim 1 wherein said intermediate core section of each of said collapsible core elements projects above the associated first and second core sections so that withdrawal of the intermediate core sections reduces the height of the collapsible cores.

3. A mold as defined in claim 1 wherein the intermediate core section of each of the collapsible core elements defines one maximum cross-sectional dimension of the associated collapsible core element whereby withdrawal of the intermediate core sections reduces both the length and width dimensions of the cross sections of the collapsible core elements.

4. A mold as defined in claim 2 wherein the intermediate core section of each of the collapsible core elements defines one maximum cross-sectional dimension of the associated collapsible core element whereby withdrawal of the intermediate core sections reduces both the length and width dimensions of the cross sections of the collapsible core elements.

5. A mold as defined in claim 1 wherein said magnetic means of each of said collapsible core elements includes a magnet carried by said first core section and magnetic material carried by said second core section, said intermediate core sections having an opening between the associated magnet and magnetic material.

6. A mold as defined in claim 1 wherein said means for mounting includes a rib on said first platelike member and a flange on said first core section defining a hole for slidably receiving said rib.

7. A mold as defined in claim 6 wherein said magnetic means of each of said collapsible core elements includes a magnet carried by said first core section and magnetic material carried by said second core section, said intermediate core sections having an opening between the associated magnet and magnetic material, said intermediate core section of each of said collapsible core elements projects above the associated first and second core section, the intermediate core section of each of the collapsible core elements defines one maximum cross-sectional dimension of the associated collapsible core element whereby withdrawal of the intermediate core sections reduces both the length and width dimensions of the cross sections of the collapsible core elements and the height of said core elements.